United States Patent [19]

Bertone et al.

[11] 4,389,903

[45] Jun. 28, 1983

[54] INDICATING SYSTEM FOR ATMOSPHERIC PUMP ARRANGEMENT

[75] Inventors: Gregory A. Bertone; Clayton J. Bossart, both of Monroeville, Pa.

[73] Assignee: Mine Safety Appliances Company, Pittsburgh, Pa.

[21] Appl. No.: 260,374

[22] Filed: May 4, 1981

[51] Int. Cl.$^{3}$ .............................................. G01N 1/24

[52] U.S. Cl. .............................. 73/863.03; 73/863.23; 340/529; 340/607

[58] Field of Search ........... 73/863.02, 863.03, 863.11, 73/863.12, 863.23, 863.24, 863.25; 340/529, 606, 607

[56] References Cited

U.S. PATENT DOCUMENTS 3,855,515 12/1974 Hutchens, Jr. ........................ 417/44
3,925,773 12/1975 Green ................................ 340/529
4,067,705 1/1978 Kurz ................................ 73/863.03
4,269,059 5/1981 Baker .............................. 73/863.03

*Primary Examiner*—S. Clement Swisher
*Attorney, Agent, or Firm*—Thomas H. Murray

[57] ABSTRACT

An atmospheric sampling pump arrangement employing a mass flow sensor which electronically monitors mass flow and compares it to a set-point value. The pump is then controlled in a manner that will minimize the difference between the measured flow and the set-point value. When the flow output drops below a predetermined value, a signal is energized to indicate the inability to maintain the desired flow. The system also incorporates a timer circuit which counts up the total amount of time that loss of flow regulation exists. After a predetermined period of cumulative loss of flow regulation, typically 30 minutes, a signal is energized to indicate this condition.

8 Claims, 3 Drawing Figures

INDICATING SYSTEM FOR ATMOSPHERIC PUMP ARRANGEMENT

BACKGROUND OF THE INVENTION

While not limited thereto, the present invention is particularly adapted for use with an atmospheric sampling pump used in coal mines and other areas of high-dust content. In a sampling pump arrangement of this type, dust-laden air is drawn through a disc filter, the filter being weighed before and after a predetermined time interval (usually 8 hours) to determine the amount of dust which has been collected and, hence, the dust content of the surrounding atmosphere. In order to obtain an accurate indication of dust concentration, however, it is necessary to utilize a pump which draws air through the filter at a constant mass flow rate. This is accomplished with the use of a mass flow sensor which electronically monitors mass flow and compares it to a set-point value. The pump is then controlled in a manner that will minimize the difference between the measured flow and the set-point value. The mass flow regulation is automatically maintained until the compliance range of the pump is exceeded (i.e., excessive pneumatic loading).

SUMMARY OF THE INVENTION

In an atmospheric sampling pump of the type described above, it is desirable to indicate to the operator when the mass flow rate drops below a predetermined value and when a cumulative loss of flow regulation occurs. Accordingly, an object of the invention is to provide apparatus in an atmospheric sampling pump for indicating when the flow output drops below a set-point value by a predetermined amount and to indicate when a cumulative loss of flow regulation exists in excess of a predetermined period.

Specifically, there is provided an atmospheric sampling pump arrangement including a mass flow sensor for producing an output signal proportional to mass airflow. Means are provided for comparing the output signal from the mass flow sensor with a set-point voltage to produce a signal voltage when mass airflow drops below a predetermined limit, typically 80% of the set-point value. This signal voltage, indicating a drop in mass airflow below a predetermined limit, is then utilized to energize an indicator such as a light-emitting diode. The system also includes a counter which counts up when the mass airflow is below normal and the aforesaid signal voltage exists. After the counter counts up to a predetermined value, a second indicating means, such as a second LED, is energized to indicate that the cumulative loss of flow regulation has exceeded permissible limits.

The above and other objects and features of the invention will become apparent from the following detailed description taken in connection with the accompanying drawings which form a part of this specification, and in which.

Figure 1:
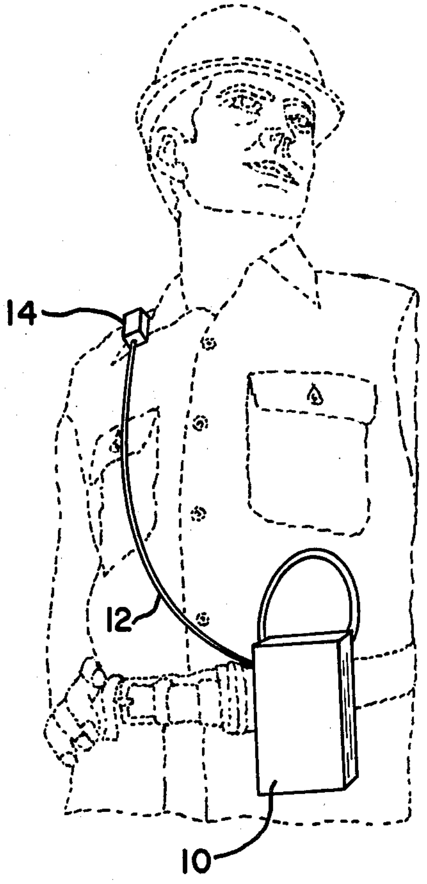
FIG. 1 is perspective view, showing the manner in which an atmospheric sampling pump is used by a miner, for example.

With reference now to the drawings, and particularly to FIG. 1, there is shown an atmospheric sampling pump of the type with which the present invention may be used. The pump itself is enclosed within a cartridge 10 which can be clamped onto miner's belt, for example. The pump produces a negative pressure in conduit 12 leading to a filter unit 14 which may be clipped to the miner's collar as shown in FIG. 1. Air within a coal mine, for instance, is drawn through the filter 14 and pumped through the pump in housing 10 such that dust concentration can be determined by weighing the filter before and after it is used, typically for a period of about eight hours. In order to accomplish an accurate determination of dust content, it is necessary to maintain the mass flow rate through the sampling pump above a predetermined level for substantially the entire sampling period. The present invention provides a means for monitoring both mass flow rate as well as cumulative loss of flow regulation. When either of these parameters are below acceptable levels, visual signals are produced.

Figure 2:
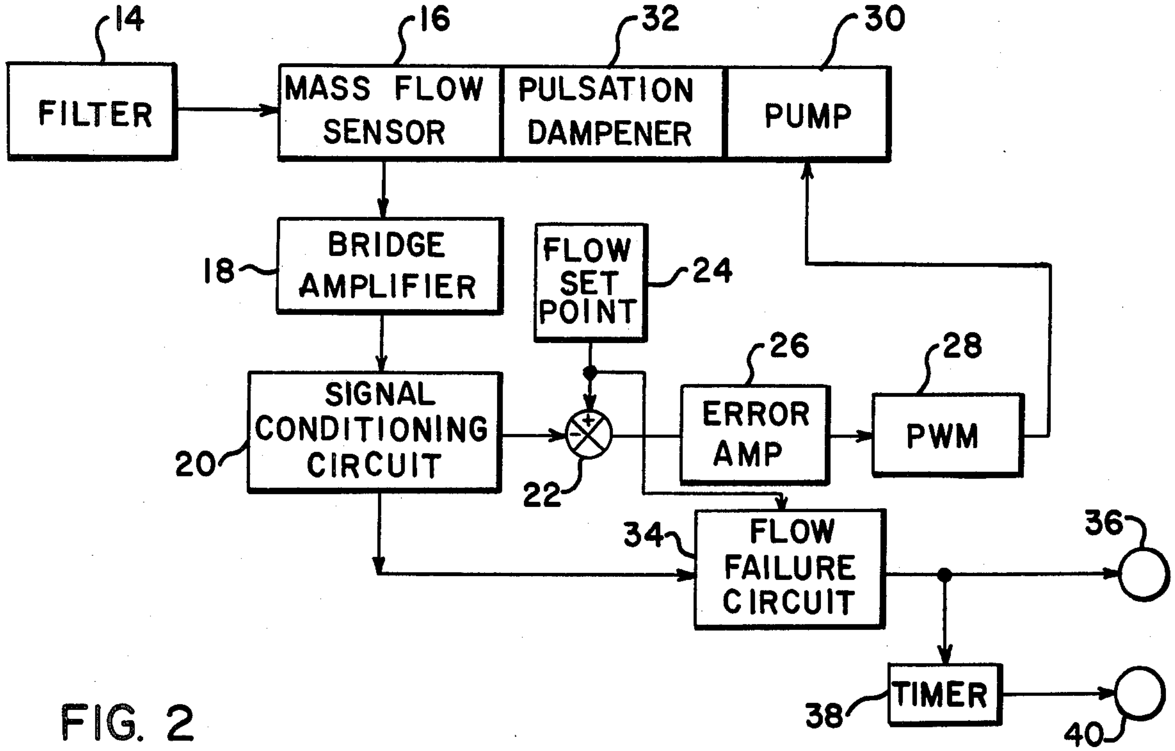
FIG. 2 is a block schematic circuit diagram of the overall atmospheric sampling pump arrangement of the invention.

A block diagram of the overall system is shown in FIG. 2. After passing through filter 14, air flow is measured by a mass flow sensor 16 which comprises a "hot" wire filament and a compensating temperature filament connected in a bridge arrangement. Sensor 16, in turn, is connected to a bridge amplifier 18 which functions to maintain the sensor bridge in balance at all times in a manner hereinafter described.

From the bridge amplifier 18, the signal passes to a signal-conditioning circuit 20 and thence to a summation point 22 where it is compared with a set-point signal derived from circuit 24. If the output of the signal-conditioning circuit 20 is above or below the set-point voltage, error amplifier 26 supplies a signal to pulse-width modulator 28 to thereby vary the width of pulses applied to the pump 30. In this respect, the speed of the pump motor is varied by adjusting the duty cycle of the square wave. Longer duty cycles give faster motor speeds; while shorter duty cycles give slower motor speeds. A pulsation dampener 32 between the mass flow sensor 16 and pump 30 pneumatically smooths the airflow created by the pump for accurate measurement by the mass flow sensor.

The output of the signal-conditioning circuit 20 is also applied to a flow failure circuit 34 where it is compared with a set-point signal derived from circuit 24. When the flow output drops below approximately 80% of the set-point value, a first light-emitting diode 36 is energized, signaling an inability to maintain the desired flow. By adjusting circuit components, the set-point value at which element 36 will be energized can be varied from 10% to 90%. The output of the flow failure circuit 34 also actuates a timer 38 which counts up the total amount of time that loss of flow regulation exists. After loss of flow regulation exists for a predetermined time, typically about 30 minutes, the timer energizes a second light-emitting diode 40 to indicate this condition.

Figure 3:
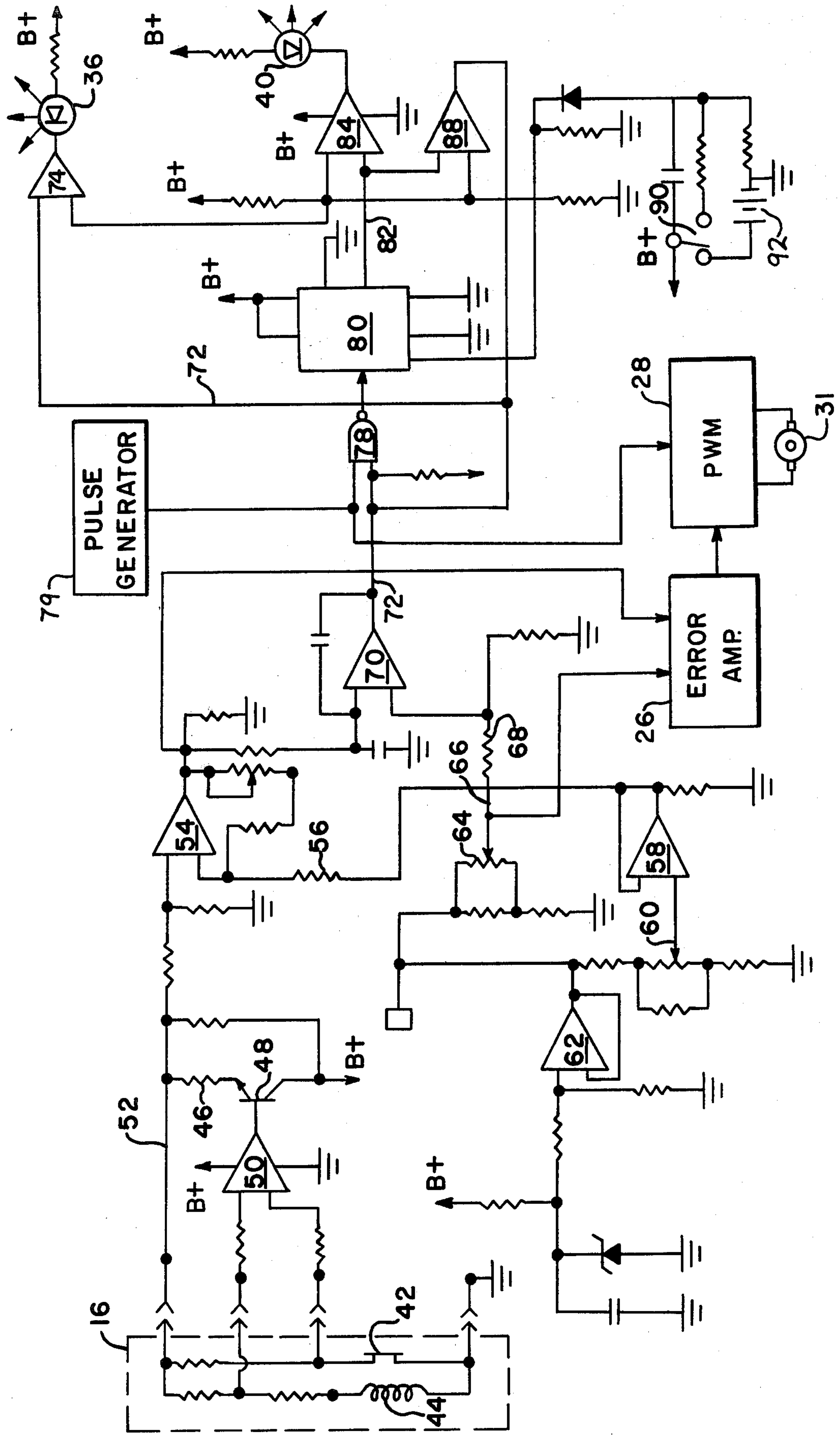
FIG. 3 comprises a schematic circuit diagram of the mass flow sensor, signal-conditioning circuitry, flow failure circuitry and timer of the invention.

With reference now to FIG. 3, the details of the loss of flow regulation and cumulative loss of flow regulation indicators are shown. The mass flow sensor 16 includes a "hot" wire filament 42 and a compensator temperature filament 44 connected in a bridge circuit arrangement. One of the input terminals to the bridge is connected to ground; while the other is connected through resistor 46 and transistor 48 to a B+ voltage source. The output terminals of the bridge are connected to the two inputs of an operational amplifier 50, the output of amplifier 50 being applied to the base of transistor 48. Amplifier 50 monitors the voltage between both legs of the bridge and adjusts the bridge excitation voltage to maintain zero volts between these points. As the bridge becomes more and more unbalanced due to an increase in the rate of flow, the voltage across the bridge increases as does the voltage on lead 52. This voltage is applied to one input of an operational amplifier 54, the other input being connected through resistor 56 and operational amplifier 58 to a zero-adjust potentiometer 60. Under quiescent conditions, the voltage appearing on lead 52 is approximately 1 volt. The amplifier 54 and its associated circuit components zeros and spans the signal from the bridge amplifier, thus producing a 0–1 volt output.

The voltage across the potentiometer 60 is applied from operational amplifier 62, this same output being applied across potentiometer 64 which establishes the flow set-point value. The movable tap on potentiometer 64 is connected to error amplifier 26 where it is compared with the output of amplifier 54, the resulting error signal being applied to pulse-width modulator 28 to control the speed of pump motor 31. Movable tap 64 is also connected through lead 66 and resistor 68 to one input of operational amplifier 70. The other input to operational amplifier 70 comprises the output of operational amplifier 54. Thus, the voltage across the bridge 16, being indicative of mass flow rate, is zero-adjusted by amplifier 54 and compared with the flow rate set-point voltage from potentiometer 64. If the two are not the same, the operational amplifier 70 produces an output on lead 72 which, through operational amplifier 74, energizes the light-emitting diode 36, indicating a loss of flow regulation. Normally, the light-emitting diode 36 will be energized when the flow output drops below approximately 80% of the set-point value; however by adjusting the potentiometer 64, the set-point value can be varied from 10% to 90%.

The output of the operational amplifier 70 on lead 72 is also applied to a NAND circuit 78 whose other input is connected to a fixed frequency pulse generator 79. Pulse generator 79 also supplies pulses to the pulse-width modulator 28 as shown. When an output appears on lead 72 from amplifier 70, pulses from generator 79 are applied to a counter 80. When the counter counts up to a predetermined value, an output appears on lead 82 which, through operational amplifier 84, energizes the second light-emitting diode 40, indicating that the cumulative loss of flow regulation has exceeded a predetermined level, typically 30 minutes. When an output appears on lead 82, operational amplifier 84 will energize light-emitting diode 40 and light-emitting diode 36 is deenergized by amplifier 88. Counter 80 is then latched and can be reset only by an ON-OFF switch 90 which serves to connect the circuitry shown to a battery 92.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In an atmospheric sampling pump arrangement, the combination of a mass flow sensor for producing an output signal proportional to mass airflow of atmospheric air, means for comparing said output signal with a set-point voltage to produce a signal voltage when mass airflow drops below a predetermined limit, means for indicating the existence of said signal voltage, a counter, means for enabling said counter to count up when said signal voltage exists, and second indicating means which is actuated when said counter counts up to a predetermined value.

2. The sampling pump arrangement of claim 1 wherein the means for comparing said output signal with a set-point voltage comprises an operational amplifier having one input terminal to which said output signal is applied and another input terminal to which is applied said set-point voltage.

3. The sampling pump arrangement of claim 2 wherein said set-point voltage is derived from a potentiometer and is adjustable.

4. The atmospheric sampling pump arrangement of claim 2 including a pulse generator, and a logic circuit to which the output of said pulse generator and the output of said operational amplifier are applied, the output of the logic circuit being used to enable said counter.

5. The sampling pump arrangement of claim 1 wherein said means for indicating the existence of said signal voltage and said second indicating means each comprises a light-emitting diode.

6. The sampling pump arrangement of claim 1 wherein said mass flow sensor includes an atmospheric sampling pump, and a filter coupled by a conduit to said atmospheric sampling pump.

7. The sampling pump arrangement of claim 6 including means for attaching said mass flow sensor to the clothing of a person.

8. The sampling pump arrangement of claim 6 including a cartride for enclosing said pump.

* * * * *